United States Patent
Ando (10) Patent No.: US 12,165,785 B2
(45) Date of Patent: Dec. 10, 2024

(54) GROMMET

(71) Applicant: SUMITOMO WIRING SYSTEMS, LTD., Mie (JP)

(72) Inventor: Yusuke Ando, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 191 days.

(21) Appl. No.: 17/798,527

(22) PCT Filed: Jan. 28, 2021

(86) PCT No.: PCT/JP2021/003014
§ 371 (c)(1),
(2) Date: Aug. 9, 2022

(87) PCT Pub. No.: WO2021/166579
PCT Pub. Date: Aug. 26, 2021

(65) Prior Publication Data
US 2023/0135801 A1     May 4, 2023

(30) Foreign Application Priority Data
Feb. 18, 2020   (JP) ................. 2020-025175

(51) Int. Cl.
*H01B 17/30*     (2006.01)
*B60R 16/02*     (2006.01)
(Continued)

(52) U.S. Cl.
CPC ....... *H01B 17/301* (2013.01); *B60R 16/0222* (2013.01); *H01B 17/583* (2013.01); *H02G 3/22* (2013.01)

(58) Field of Classification Search
CPC ........................ H01B 17/301; H01B 17/583; B60R 16/0222; H02G 3/22; H02G 3/30; H02G 3/32; H02G 3/36; H02G 3/38
(Continued)

(56) References Cited

U.S. PATENT DOCUMENTS 5,138,117 A * 8/1992 Oikawa ............... H02G 3/088
                                                    174/152 G
6,541,703 B2 * 4/2003 Nakata ............. B60R 16/0222
                                                    174/152 G
(Continued)

FOREIGN PATENT DOCUMENTS

| JP | 2005-302478 A | 10/2005 |
| JP | 2011-259643 A | 12/2011 |
| JP | 2018-046683 A | 3/2018 |

OTHER PUBLICATIONS

International Search Report issued on Apr. 13, 2021 for WO 2021/166579 A1 (4 pages).

*Primary Examiner* — Roshn K Varghese
(74) *Attorney, Agent, or Firm* — Venjuris, P.C.

(57) ABSTRACT

One aspect of the present disclosure provides a grommet that can improve water sealing property. A grommet main body according to one aspect of the present disclosure includes an opposing portion that opposes a circumferential portion of an attachment hole of a vehicle body panel and an annular seal portion that is provided in the opposing portion and is brought into tight contact with the vehicle body panel. The seal portion includes an annular first lip portion that extends from the opposing portion toward the vehicle body panel and an annular second lip portion that extends from the opposing portion toward the vehicle body panel and is provided radially inward of the first lip portion. The first lip portion is inclined radially outward toward the tip end of the first lip portion, and the second lip portion is inclined
(Continued)

radially inward toward the tip portion of the second lip portion.

7 Claims, 5 Drawing Sheets

(51) Int. Cl.
*H01B 17/58* (2006.01)
*H02G 3/22* (2006.01)
*H02G 3/30* (2006.01)

(58) Field of Classification Search
USPC .......................................... 174/152 G, 153 G
See application file for complete search history.

(56) References Cited

U.S. PATENT DOCUMENTS

| 2012/0291220 | A1 | 11/2012 | Okuhara et al. |
| 2016/0039368 | A1* | 2/2016 | Shitamichi .......... B60R 16/0222 16/2.2 |

* cited by examiner

GROMMET

CROSS REFERENCE TO RELATED APPLICATIONS

This application is a national phase of PCT application No. PCT/JP2021/003014, filed on 28 Jan. 2021, which claims priority from Japanese patent application No. 2020-025175, filed on 18 Feb. 2020, all of which are incorporated herein by reference.

TECHNICAL FIELD

The present disclosure relates to a grommet.

BACKGROUND

For example, a grommet disclosed in Patent Document 1 is configured to be attached to an attachment hole formed in a vehicle body panel to prevent water from entering between the attachment hole and a wire harness that is passed through the attachment hole. To describe in detail, the grommet includes an annular seal portion that is configured to be in tight contact with a circumferential portion of the attachment hole of the vehicle body panel to prevent water and the like from entering the attachment hole via the seal portion.

PRIOR ART DOCUMENT

Patent Document

Patent Document 1: JP 2018-046683 A

SUMMARY OF THE INVENTION

Problems to be Solved

The inventors of the present application conducted studies on a configuration of a seal portion that can be used in a grommet as described above to improve water sealing property.

It is an object of the present disclosure to provide a grommet that can improve water sealing property.

Means to Solve the Problem

A grommet according to the present disclosure is a grommet that is attached to an attachment hole of a vehicle body panel through which a wire harness is passed, the grommet including: an opposing portion that opposes a circumferential portion of the attachment hole of the vehicle body panel; and an annular seal portion that is provided in the opposing portion and is brought into tight contact with the vehicle body panel, wherein the seal portion includes: an annular first lip portion that extends from the opposing portion toward the vehicle body panel; and an annular second lip portion that extends from the opposing portion toward the vehicle body panel and is provided radially inward of the first lip portion, the first lip portion is inclined radially outward toward a tip end of the first lip portion, and the second lip portion is inclined radially inward toward a tip end of the second lip portion.

Effect of the Invention

According to the present disclosure, it is possible to provide a grommet that can improve water sealing property.

DETAILED DESCRIPTION TO EXECUTE THE INVENTION

Description of Embodiment of the Present Disclosure

First, aspects of an embodiment according to the present disclosure will be listed and described.

[1] A grommet according to the present disclosure is a grommet that is attached to an attachment hole of a vehicle body panel through which a wire harness is passed, the grommet including: an opposing portion that opposes a circumferential portion of the attachment hole of the vehicle body panel; and an annular seal portion that is provided in the opposing portion and is brought into tight contact with the vehicle body panel, wherein the seal portion includes: an annular first lip portion that extends from the opposing portion toward the vehicle body panel; and an annular second lip portion that extends from the opposing portion toward the vehicle body panel and is provided radially inward of the first lip portion, the first lip portion is inclined radially outward toward a tip end of the first lip portion, and the second lip portion is inclined radially inward toward a tip end of the second lip portion.

With this configuration, the first lip portion and the second lip portion are inclined so as to be spaced apart from each other in the radial direction. Accordingly, when the first lip portion and the second lip portion are brought into tight contact with the vehicle body panel, the space surrounded by the first lip portion, the second lip portion, and the vehicle body panel is brought into a negative pressure (substantially vacuum), and it is therefore possible to cause the seal portion to adhere by suction to the vehicle body panel. When the seal portion adheres by suction to the vehicle body panel, a gap is unlikely to be formed between the vehicle body panel and the seal portion, as a result of which, the water sealing property of the seal portion is improved.

[2] In a state in which the grommet is attached to the vehicle body panel, an outer surface of the first lip portion and an outer surface of the second lip portion are spaced apart from the opposing portion.

With this configuration, it is possible to prevent the first lip portion and the second lip portion adhering by suction to the vehicle body panel from being compressed and collapsed by the opposing portion. As a result, it is possible to appropriately keep the state in which the first lip portion and the second lip portion adhere by suction to the vehicle body panel.

[3] The vehicle body panel is a panel that separates an inside from an outside of a cabin of the vehicle, and the grommet is configured such that, in a state in which the grommet is attached to the vehicle body panel, the first lip portion and the second lip portion are in tight contact with an inside surface of the vehicle body panel.

With this configuration, the seal portion adhering by suction to the vehicle body panel can appropriately prevent water that has entered from the outside to the inside of the cabin of the vehicle via the attachment hole despite the fact that the outside surface of the vehicle body panel is likely to get wet.

[4] The grommet includes: a grommet main body that includes the opposing portion and the seal portion; and an inner member that is made of a material that is more rigid than the grommet main body. The inner member includes: an engagement piece that is engaged with a surface of the vehicle body panel that is opposite to a surface to which the seal portion is brought into tight contact with at a circumferential edge of the attachment hole; and a flange portion that is held by the opposing portion of the grommet main body. In a state in which the engagement piece is engaged with and attached to a circumferential edge of the attachment hole, the seal portion is compressed between the vehicle body panel and the flange portion. With this configuration, the seal portion is compressed between the vehicle body panel and the flange portion of the inner member, and it is therefore possible to appropriately cause the seal portion to adhere by suction to the vehicle body panel.

[5] The opposing portion includes an intermediate portion that is provided between the flange portion and the vehicle body panel. The second lip portion extends from the intermediate portion toward the vehicle body panel. The intermediate portion is formed such that a thickness of the intermediate portion increases in a direction in which the flange portion and the vehicle body panel oppose each other as the intermediate portion extends toward a base end portion of the second lip portion. With this configuration, the rigidity of the intermediate portion provided between the flange portion and the vehicle body panel can be ensured.

DETAILED DESCRIPTION OF EMBODIMENT OF THE PRESENT DISCLOSURE

A specific example of a grommet according to the present disclosure will be described below with reference to the drawings. It is to be noted that the present invention is not limited to examples given below, the scope of the present invention is indicated by the appended claims, and all changes that come within the meaning and range of equivalency of the claims are intended to be embraced within the scope of the present invention. The term "perpendicular" used in the present disclosure does not only strictly mean "perpendicular", but also encompasses a meaning that can be deemed as "perpendicular" as long as the advantageous effects of the present invention can be achieved.

Figure 1:
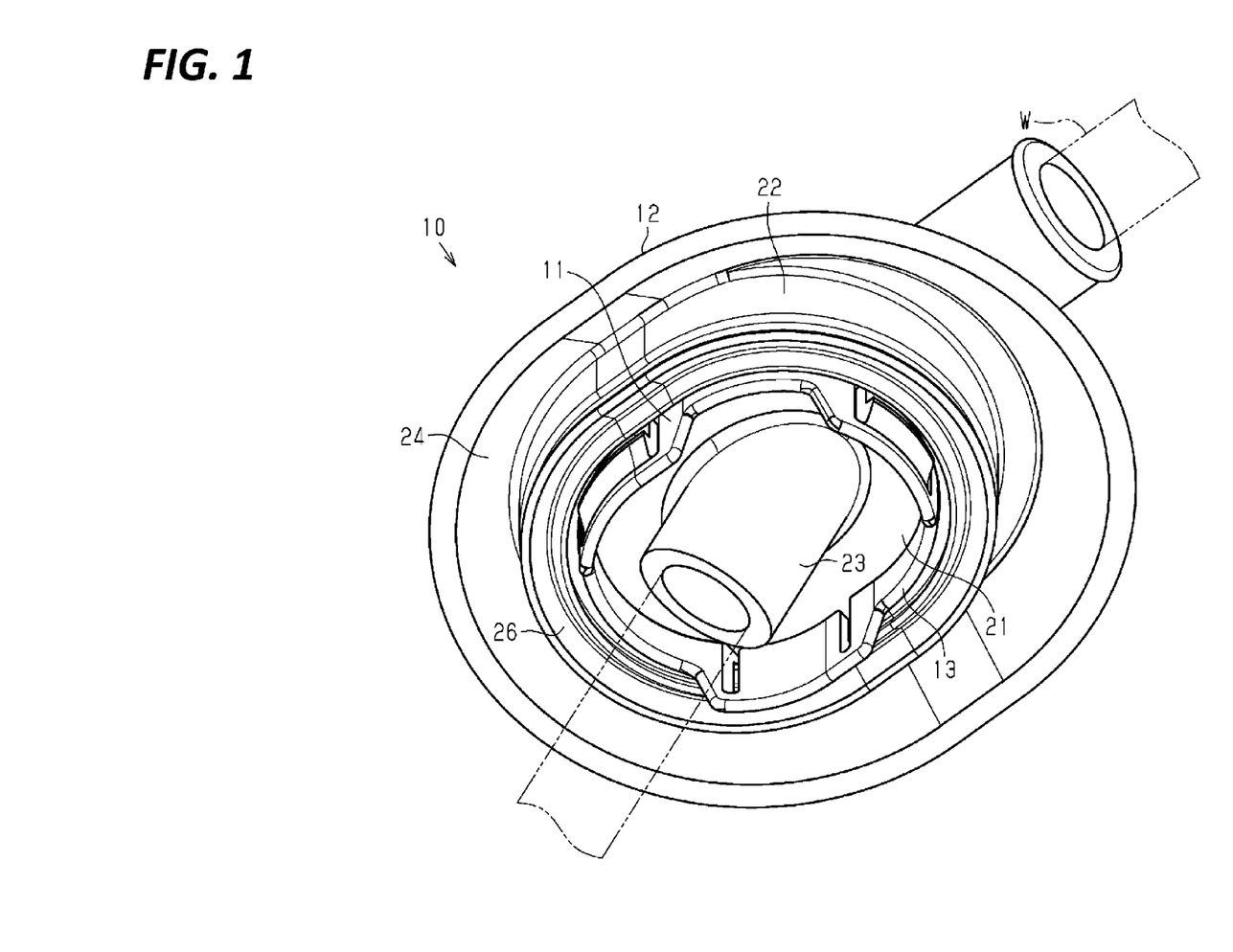
FIG. 1 is a perspective view of a grommet according to an embodiment.
Figure 3:
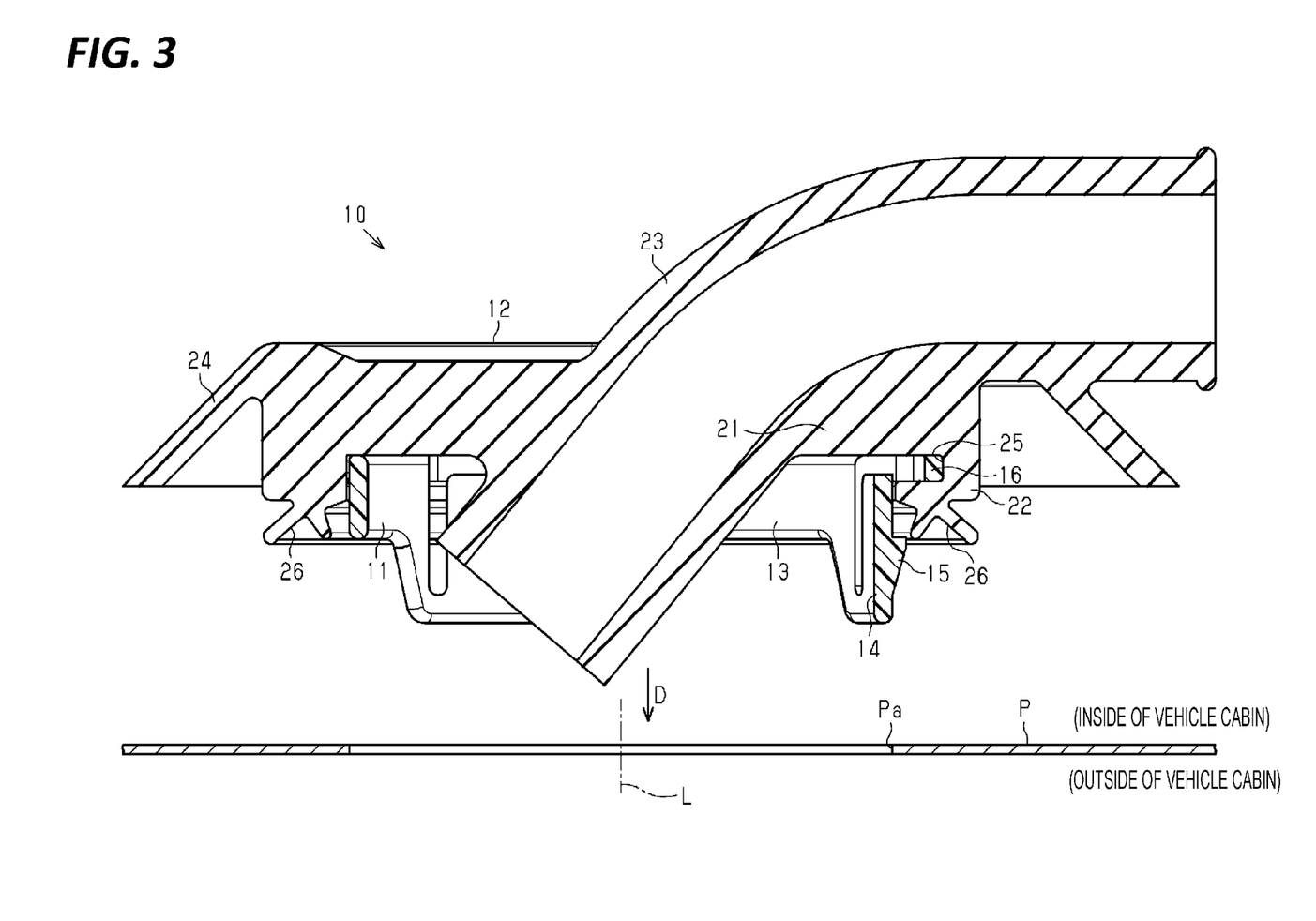
FIG. 3 is a cross-sectional view of the grommet according to the embodiment.

A grommet 10 according to an embodiment of the present disclosure shown in FIGS. 1 and 3 is attached to an attachment hole Pa formed in a vehicle body panel P that separates the inside from the outside of the cabin of the vehicle to ensure water sealing property between the attachment hole Pa and a wire harness W that is passed through the attachment hole Pa. In addition, the grommet 10 also functions to protect the wire harness W that is passed through the attachment hole Pa.

The vehicle body panel P is a panel that separates the inside from the outside (for example, the engine room) of the cabin of the vehicle. The grommet 10 according to the present embodiment is attached to the attachment hole Pa from the inside of the cabin of the vehicle. The wire harness W includes at least one electrical wire.

The grommet 10 includes an inner member 11 that is inserted into the attachment hole Pa of the vehicle body panel P and a grommet main body 12 that is attached to the inner member 11. The grommet main body 12 is made of a highly flexible material (for example, an elastomer such as EPDM (ethylene propylene rubber)). The inner member 11 is made of a material (for example, a synthetic resin material such as PP (polypropylene)) that is more rigid than the grommet main body 12.

(Inner Member 11)

Figure 2:
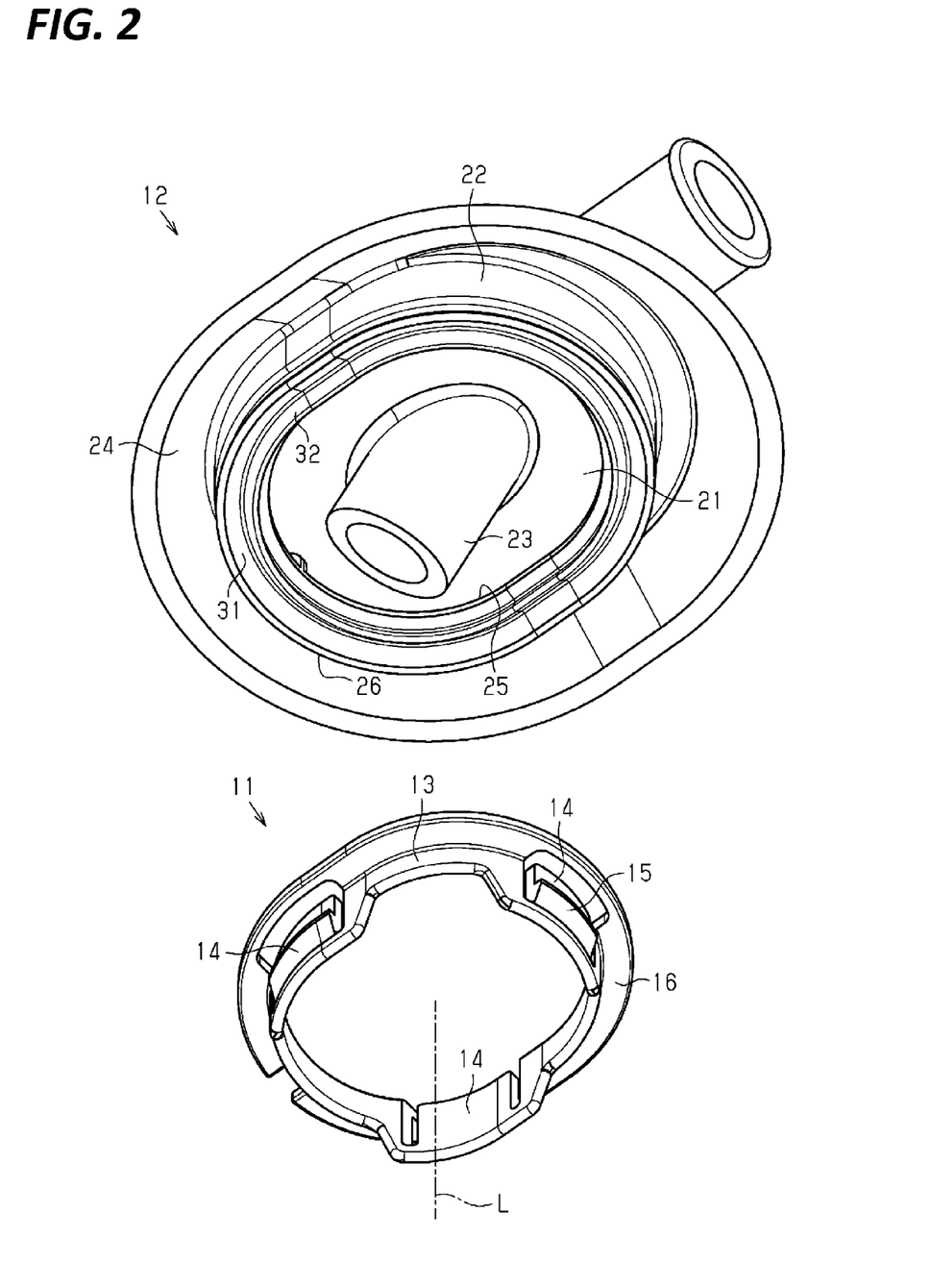
FIG. 2 is an exploded perspective view of the grommet according to the embodiment.

As shown in FIGS. 2 and 3, the inner member 11 includes a tubular portion 13. The tubular portion 13 has a shape that conforms to the shape of an opening of the attachment hole Pa when viewed from the axial direction of the tubular portion 13. In the description given below, a direction that is orthogonal to the central axis L of the tubular portion 13 will be referred to as "radial direction". A plurality of engagement pieces 14 are formed around the tubular portion 13. In the present embodiment, three engagement pieces 14 are provided substantially equidistantly in the circumferential direction of the tubular portion 13.

Each engagement piece 14 is configured to bend in the radial direction of the tubular portion 13. Each engagement piece 14 includes a protruding portion 15 that protrudes radially outward. The protruding portion 15 of each engagement piece 14 is configured to be capable of engaging with the circumferential edge of the attachment hole Pa in a direction opposite to an insertion direction D in which the grommet 10 is inserted (see FIG. 5). In the present embodiment, the protruding portion 15 engages with the outside surface of the vehicle body panel P.

The inner member 11 includes a flange portion 16 that extends radially outward from the tubular portion 13. The flange portion 16 is formed at one end portion of the tubular portion 13 in the axis L direction (a rear end portion in the insertion direction D). The flange portion 16 has a flat plate-like shape that is substantially perpendicular to the central axis L. The flange portion 16 has an outer shape larger than the attachment hole Pa of the vehicle body panel P when viewed in the axis L direction. In a state in which the grommet 10 is attached to the attachment hole Pa, the flange portion 16 is located on the inside of the vehicle body panel P.

(Grommet Main Body 12)

As shown in FIGS. 2 and 3, the grommet main body 12 includes a base portion 21 that closes the attachment hole Pa. The base portion 21 has a shape larger than the attachment hole Pa when viewed in the axis L direction. The base portion 21 includes, at the outer circumferential edge portion of the base portion 21, an opposing portion 22 that opposes the circumferential portion of the attachment hole Pa of the vehicle body panel P in the axis L direction. The opposing portion 22 extends along the entire outer circumferential edge portion of the base portion 21 in the circumferential direction.

The base portion 21 of the grommet main body 12 includes a cylindrical insertion portion 23 into which the wire harness W is inserted. The insertion portion 23 covers the outer circumference of the wire harness W. Also, the wire harness W is inserted through the insertion portion 23 while the water sealing property is ensured. In the present embodiment, the wire harness W is inserted into the attachment hole Pa such that the wire harness W is inclined relative to the axis L direction, and thus the insertion portion 23 is inclined relative to the axis L direction to conform to the insertion direction in which the wire harness W is inserted. Also, in a state in which the grommet main body 12 and the inner member 11 are attached, the insertion portion 23 of the grommet main body 12 is inserted through the inner circumference of the tubular portion 13.

Also, the grommet main body 12 according to the present embodiment includes an umbrella-shaped covering portion 24 that extends from the outer circumferential edge of the base portion 21 toward the outer circumference of the grommet main body 12. The covering portion 24 is configured to close an opening of an insulator (sound insulating member) (not shown) that is attached to the inside surface of the vehicle body panel P.

Figure 4:
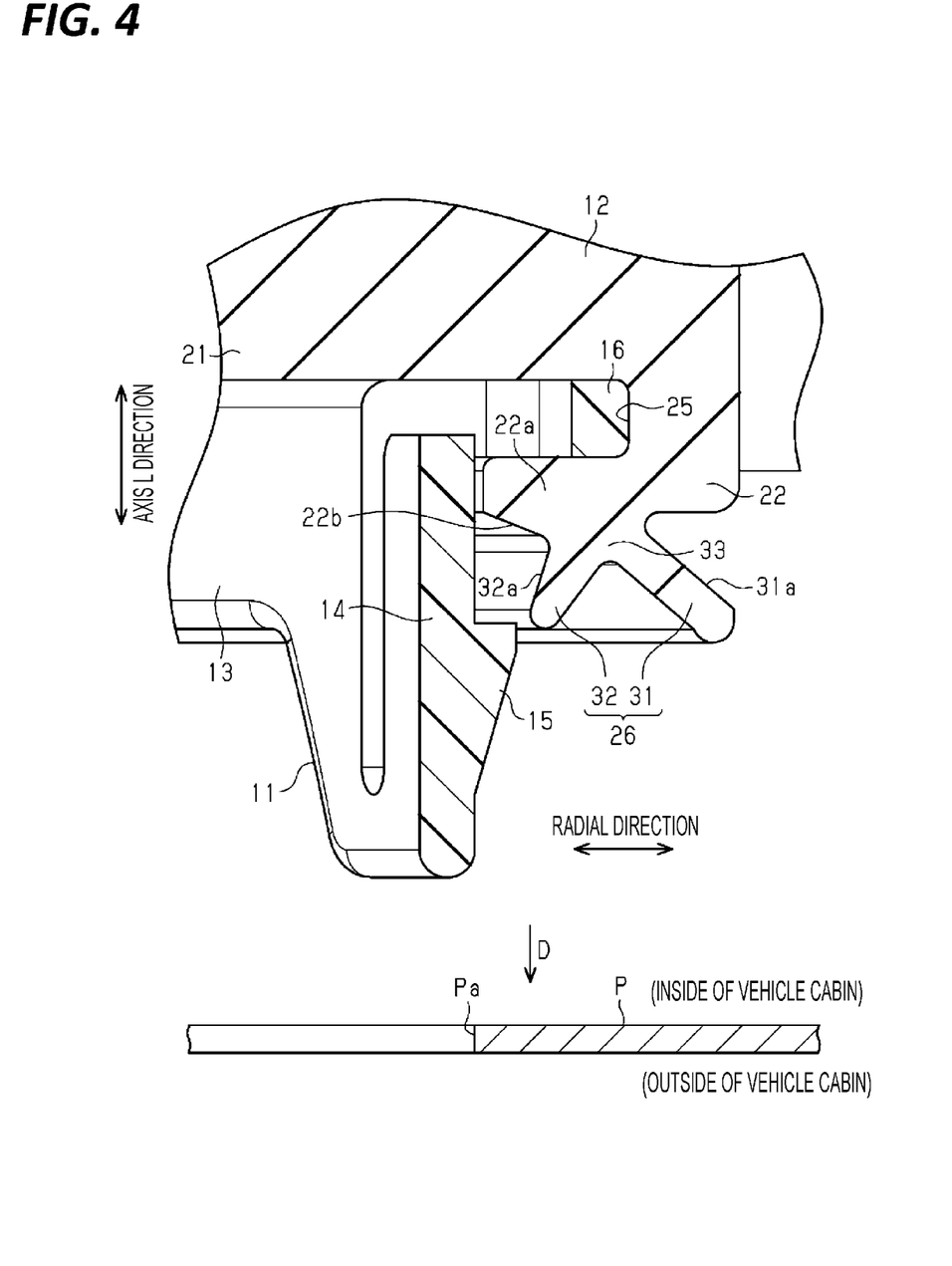
FIG. 4 is an enlarged cross-sectional view of a relevant part of the grommet according to the embodiment.

As shown in FIGS. 3 and 4, the opposing portion 22 of the base portion 21 includes a holding portion 25 for holding the flange portion 16 of the inner member 11. The holding portion 25 is formed in an annular shape about the axis L direction. The holding portion 25 is shaped to have a recess extending radially outward, and the flange portion 16 is fitted into the recess. Specifically, the holding portion 25 is configured to cover both surfaces of the flange portion 16 in the axis L direction as well as a radially outer surface of the flange portion 16.

(Seal Portion 26)

On one surface of the opposing portion 22 in the axis L direction, or to be more specific, on a surface of the opposing portion 22 on the forward side in the insertion direction D (the surface that opposes the vehicle body panel P), a seal portion 26 that is brought into tight contact with the circumferential portion of the attachment hole Pa of the vehicle body panel P is formed. The seal portion 26 has an annular shape that is larger than the attachment hole Pa and extends along the circumferential edge of the attachment hole Pa. In the present embodiment, the seal portion 26 is configured to be in tight contact with the inside surface of the vehicle body panel P.

Figure 5:
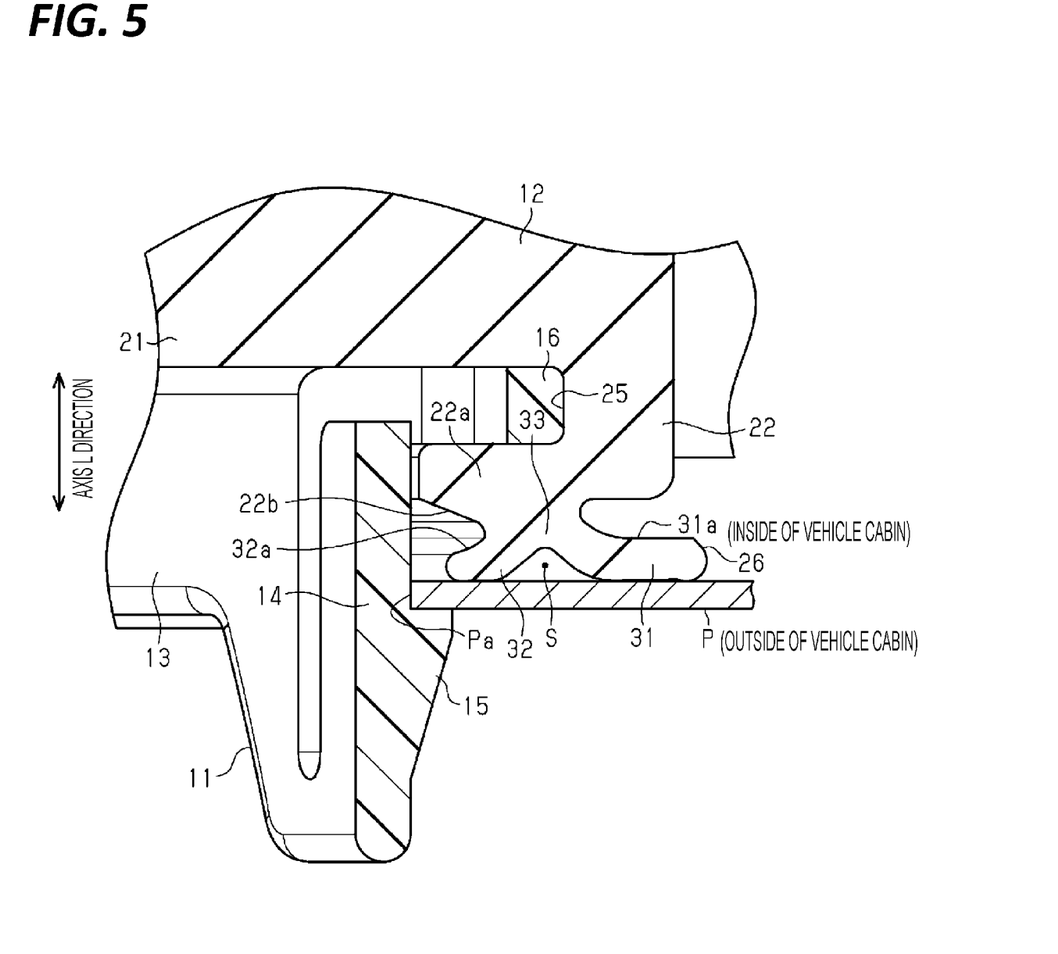
FIG. 5 is an enlarged cross-sectional view of a relevant part of the grommet that has been attached to a vehicle body panel.

As shown in FIGS. 4 and 5, the seal portion 26 includes a first lip portion 31 and a second lip portion 32. The first lip portion 31 and the second lip portion 32 each extend from the opposing portion 22 toward the vehicle body panel P. The second lip portion 32 has an annular shape that is larger than the attachment hole Pa and extends along the circumferential edge of the attachment hole Pa. The first lip portion 31 has an annular shape that is larger than the second lip portion 32. That is, the second lip portion 32 is provided radially inward of the first lip portion 31. Also, the first lip portion 31 and the second lip portion 32 oppose each other in the radial direction.

The first lip portion 31 is inclined radially outward toward the tip end of the first lip portion 31 (or in other words, as the distance from the opposing portion 22 increases). Likewise, the second lip portion 32 is inclined radially inward toward the tip end of the second lip portion 32 (or in other words, as the distance from the opposing portion 22 increases). Also, the seal portion 26 according to the present embodiment includes a crossing portion 33 where a base end portion of the first lip portion 31 and a base end portion of the second lip portion 32 cross each other. Accordingly, a cross section of the seal portion 26 taken along the axis L direction has a substantially V shape that is open toward the vehicle body panel P. Also, in a state in which the grommet 10 is attached to the vehicle body panel P, the inner surfaces (mutually opposing surfaces) of the first lip portion 31 and the second lip portion 32 are brought into tight contact with the circumference of the attachment hole Pa on the inside surface of the vehicle body panel P (see FIG. 5).

The opposing portion 22 includes an intermediate portion 22a that is provided between the seal portion 26 and the flange portion 16 in the axis L direction. A surface of the intermediate portion 22a that opposes the second lip portion 32 in the axis L direction forms an inclined surface 22b. The inclined surface 22b is inclined toward the second lip portion 32 (the vehicle body panel P) in the axis L direction as the inclined surface 22b extends radially outward. That is, the intermediate portion 22a is formed such that the thickness of the intermediate portion 22a increases in the axis L direction (the thickness of the intermediate portion 22a in a direction in which the flange portion 16 and the vehicle body panel P oppose each other) as the intermediate portion 22a extends toward the base end portion of the second lip portion 32. With this configuration, the rigidity of the intermediate portion 22a can be ensured.

The operations of the present embodiment will be described.

When the grommet 10 is inserted into the attachment hole Pa of the vehicle body panel P in the insertion direction D from the inside of the cabin of the vehicle, as shown in FIG. 5, the first lip portion 31 and the second lip portion 32 are deformed such that the inner surfaces of the first lip portion 31 and the second lip portion 32 abut against the vehicle body panel P and come closer to the opposing portion 22. Then, the intermediate portion 22a of the opposing portion 22 and the seal portion 26 are compressed between the flange portion 16 and the vehicle body panel P in the axis L direction. Also, in this state, the protruding portion 15 of each engagement piece 14 of the inner member 11 engages with the circumferential edge of the attachment hole Pa.

At this time, the seal portion 26 that includes the first lip portion 31 and the second lip portion 32 adheres by suction to the vehicle body panel P. That is, a space S surrounded by the first lip portion 31, the second lip portion 32, and the vehicle body panel P is brought into a negative pressure (substantially vacuum), as a result of which, the first lip portion 31 and the second lip portion 32 adhere to the vehicle body panel P by the action of the external pressure.

As described above, in a state in which the seal portion 26 adheres by suction to the vehicle body panel P, the first lip portion 31 and the second lip portion 32 are in sealing contact with the vehicle body panel P. For this reason, it is very unlikely that a gap is formed between the first lip portion 31 and the vehicle body panel P and between the second lip portion 32 and the vehicle body panel P, and the vehicle body panel P, and thus the water sealing property of the seal portion 26 is improved.

Also, the grommet 10 according to the present embodiment is attached to the vehicle body panel P from the inside of the cabin of the vehicle, and the seal portion 26 of the grommet main body 12 is brought into tight contact with the inside surface of the vehicle body panel P. It is the outside surface of the vehicle body panel P that is most likely to get wet, and thus water may enter from the outside of the cabin of the vehicle to the inner circumferential side of the seal portion 26 via the attachment hole Pa. For this reason, the seal portion 26 according to the present embodiment is required to have water sealing performance of preventing water on the inner circumferential side of the seal portion 26 from flowing to the outer circumferential side of the seal portion 26. In the specification of the present application, a radially outward direction in which the seal portion 26 prevents the flow of water will be referred to as "water sealing direction".

Here, as a comparative example, a configuration will be considered in which the second lip portion 32 is inclined radially outward (inclined in the same direction as the first lip portion 31). In this case, the seal portion 26 does not adhere by suction to the vehicle body panel P, and, in addition thereto, both the first lip portion 31 and the second lip portion 32 are inclined in the water sealing direction (radially outward), and it is therefore difficult to prevent water on the inner circumferential side of the seal portion 26 from flowing to the outer circumferential side of the seal portion 26.

In this regard, with the grommet 10 according to the present embodiment, due to the first lip portion 31 and the second lip portion 32, the seal portion 26 adheres by suction to the vehicle body panel P, and it is therefore possible to prevent water on the inner circumferential side of the seal portion 26 from flowing to the outer circumferential side of the seal portion 26.

Also, in a state in which the first lip portion 31 and the second lip portion 32 adhere by suction to the vehicle body panel P, an outer surface 31*a* of the first lip portion 31 and an outer surface 32*a* of the second lip portion 32 are spaced apart from the opposing portion 22. With this configuration, it is possible to prevent the first lip portion 31 and the second lip portion 32 adhering by suction to the vehicle body panel P from being compressed and collapsed by the opposing portion 22, as a result of which, the state in which the first lip portion 31 and the second lip portion 32 adhere by suction to the vehicle body panel P can be appropriately maintained.

Also, the seal portion 26 according to the present embodiment is configured such that the outer surface 31*a* of the first lip portion 31 and the outer surface 32*a* of the second lip portion 32 are spaced apart from the opposing portion 22, from which it can be seen that the configuration is not intended to ensure water sealing property by compressing and collapsing the first lip portion 31 and the second lip portion 32 in the insertion direction D. Accordingly, with the grommet 10 according to the present embodiment, an insertion force required to attach the grommet 10 to the attachment hole Pa can be minimized, which contributes to improving the ease of attachment of the grommet 10.

The advantageous effects of the present embodiment will be described.

(1) The first lip portion 31 and the second lip portion 32 are inclined so as to be spaced apart from each other in the radial direction. With this configuration, the space S surrounded by the first lip portion 31, the second lip portion 32, and the vehicle body panel P when the first lip portion 31 and the second lip portion 32 are brought into tight contact with the vehicle body panel P is brought into a negative pressure (substantially vacuum), and it is therefore possible to cause the seal portion 26 to adhere by suction to the vehicle body panel P. When the seal portion 26 adheres by suction to the vehicle body panel P, a gap is unlikely to be formed between the vehicle body panel P and the seal portion 26, as a result of which, the water sealing property of the seal portion 26 is improved.

(2) The grommet 10 is configured such that, in a state in which the grommet 10 is attached to the vehicle body panel P, the outer surface 31*a* of the first lip portion 31 and the outer surface 32*a* of the second lip portion 32 are spaced apart from the opposing portion 22. With this configuration, it is possible to prevent the first lip portion 31 and the second lip portion 32 adhering by suction to the vehicle body panel P from being compressed and collapsed by the opposing portion 22. As a result, the state in which the first lip portion 31 and the second lip portion 32 adhere by suction to the vehicle body panel P can be appropriately maintained.

(3) The vehicle body panel P is a panel that separates the inside from the outside of the cabin of the vehicle, and the grommet 10 is configured such that, in a state in which the grommet 10 is attached to the vehicle body panel P, the first lip portion 31 and the second lip portion 32 are in tight contact with the inside surface of the vehicle body panel P. With this configuration, the seal portion 26 adhering by suction to the vehicle body panel P can appropriately prevent water that has entered from the outside to the inside of the cabin of the vehicle via the attachment hole Pa despite the fact that the outside surface of the vehicle body panel P is likely to get wet.

(4) The grommet 10 includes: a grommet main body 12 that includes an opposing portion 22 and a seal portion 26; and an inner member 11 that is made of a material that is more rigid than the grommet main body 12. The inner member 11 includes: an engagement piece 14 that is engaged with a surface of the vehicle body panel P that is opposite to a surface with which the seal portion 26 is brought into tight contact at the circumferential edge of the attachment hole Pa; and a flange portion 16 that is held by the opposing portion 22 of the grommet main body 12. Also, in a state in which the engagement piece 14 is engaged with and attached to the circumferential edge of the attachment hole Pa, the seal portion 26 is compressed between the vehicle body panel P and the flange portion 16. With this configuration, because the seal portion 26 is compressed between the vehicle body panel P and the flange portion 16 of the inner member 11, it is possible to cause the seal portion 26 to appropriately adhere by suction to the vehicle body panel P.

(5) The opposing portion 22 includes an intermediate portion 22*a* that is provided between the flange portion 16 and the vehicle body panel P, and the second lip portion 32 extends from the intermediate portion 22*a* toward the vehicle body panel P. The intermediate portion 22*a* is formed such that the thickness of the intermediate portion 22*a* increases in a direction (the axis L direction) in which the flange portion 16 and the vehicle body panel P oppose each other as the intermediate portion 22*a* extends toward a base end portion of the second lip portion 32. With this configuration, the rigidity of the intermediate portion 22*a* provided between the flange portion 16 and the vehicle body panel P can be ensured.

(6) The seal portion 26 includes a crossing portion 33 where a base end portion of the first lip portion 31 and a base end portion of the second lip portion 32 cross each other. With this configuration, the first lip portion 31 and the second lip portion 32 are provided adjacent to each other in the radial direction, as a result of which, with the first lip portion 31 and the second lip portion 32, it is possible to cause the seal portion 26 to appropriately adhere by suction to the vehicle body panel P.

The present embodiment can be carried out by making medications as described below. The present embodiment and variations given below can be combined as appropriate unless they are technically contradictory to each other.

The materials for forming the grommet main body 12 and the inner member 11 are not limited to those described in the embodiment given above, and may be changed as appropriate according to the configuration.

The configuration, such as the shape, of the seal portion 26 that includes the first lip portion 31 and the second lip portion 32 is not limited to that described in the embodiment given above, and may be changed as appropriate. In order to cause the first lip portion 31 and the second lip portion 32 to appropriately adhere by suction to the vehicle body panel P, it is preferable that the lengths of the first lip portion 31 and the second lip portion 32 are not extremely different. Specifically, it is preferable that the length of one of the first lip portion 31 and the second lip portion 32 is longer than the half length of the other of the first lip portion 31 and the second lip portion 32.

In the embodiment given above, the base end portion of the first lip portion 31 and the base end portion of the second lip portion 32 cross each other, but the configuration is not limited thereto, and the base end portion of the first lip portion 31 and the base end portion of the second lip portion 32 may be radially spaced apart from each other.

The configuration, such as the shape, of the grommet main body 12 is not limited to that described in the embodiment given above, and, for example, the covering portion 24 may be omitted from the grommet main body 12 of the embodiment given above. Also, the insertion portion 23 may be configured to extend along the axis L direction (the direction in which the attachment hole Pa extends).

The embodiment given above is applied to a grommet 10 that is attached to the attachment hole Pa from the inside of the cabin of the vehicle, but may be applied to a grommet that is attached to the attachment hole Pa from the outside of the cabin of the vehicle.

The embodiment given above is applied to a grommet 10 that includes a grommet main body 12 that is made of a highly flexible material such as an elastomer and an inner member 11 that is made of a material that is more rigid than the grommet main body 12, but is also applicable to, for example, a grommet that is made only of a highly flexible material.

The present disclosure encompasses implementation examples given below. Reference numerals of the constituent elements of the embodiment are assigned to facilitate the understanding of the implementation examples and thus are not construed as limiting.

[Additional Statement 1]

A grommet (10) according to an implementation example of the present disclosure includes:

a grommet main body (12) including an annular seal portion (26) that is configured to be in tight contact with a first surface of a vehicle body panel (P) that has an attachment hole (Pa) and an opposing portion (22) that opposes an annular region that extends along a circumferential edge of the attachment hole (Pa); and an inner member (11) that includes a tubular portion (13) that is disposed on an inner circumferential side of the seal portion (26), wherein the seal portion (26) includes:

first and second lip portions (31 and 32) that extend from the opposing portion; and a crossing portion (33) where base end portions of the first and second lip portions (31 and 32) cross each other, a tip end of the first lip portion (31) may be located on an outer circumferential side relative to the crossing portion (33), and a tip end of the second lip portion (32) may be located on an inner circumference side relative to the crossing portion (33).

[Additional Statement 2]

In one or more implementation examples of the present disclosure, the tubular portion (13) may include:

a flange (16) that protrudes from a first end of the tubular portion (13) in an axial direction of the tubular portion (13); and a plurality of engagement pieces (14) that protrude from a second end of the tubular portion (13) in the axial direction of the tubular portion (13).

[Additional Statement 3]

In one or more implementation examples of the present disclosure, the plurality of engagement pieces (14) may include three or more engagement pieces (14) that are provided at intervals along the circumferential edge of the attachment hole (Pa).

[Additional Statement 4]

In one or more implementation examples of the present disclosure, the first surface may be an inside surface of the vehicle body panel (P), and the vehicle body panel (P) may include a second surface that is opposite to the first surface.

[Additional Statement 5]

In one or more implementation examples of the present disclosure, each of the plurality of engagement pieces (14) may include a protrusion that is configured to engage with the second surface at a tip end thereof.

[Additional Statement 6]

In one or more implementation examples of the present disclosure, the grommet main body (12) may further include:

a plate-like base portion (21) that covers the attachment hole (Pa); and a tubular insertion portion (23) that extends through the base portion (21), and through which a wire harness (W) is passed.

[Additional Statement 7]

In one or more implementation examples of the present disclosure, the insertion portion (23) includes: a first portion that extends along an outer surface of the base portion; and a second portion that protrudes from the base portion (21) to an inner circumferential side of the tubular portion (13), and the second portion may be inclined relative to the base portion (21) and the first portion.

[Additional Statement 8]

In one or more implementation examples of the present disclosure, the grommet main body (12) may further include an annular covering portion (24) that extends from an outer edge of the opposing portion (22).

[Additional Statement 9]

In one or more implementation examples of the present disclosure, a leading end of the covering portion (24) may include a base end that connects to the opposing portion (22) and a tip end that is located on an outer circumferential side relative to the base end.

[Additional Statement 10]

In one or more implementation examples of the present disclosure, the seal portion (26) may be configured such that a closed spaced surrounded by the first lip portion (31), the second lip portion (32), and the first surface is defined when the first and second lip portions (31 and 32) are brought into tight contact with the first surface.

[Additional Statement 11]

In one or more implementation examples of the present disclosure, the crossing portion (33) may be spaced apart from the first surface when the first and second lip portions (31 and 32) are brought into tight contact with the first surface.

[Additional Statement 12]

In one or more implementation examples of the present disclosure, the first and second lip portions (31 and 32) may elastically deform such that the tip ends of the first and second lip portions (31 and 32) are spaced apart from each other when the seal portion (26) is brought into tight contact with the first surface.

It should be apparent to those skilled in the art that the present invention may be embodied in other specific forms without departing from the technical concept of the present invention. For example, some of the components described in the embodiment (or one or more aspects thereof) may be omitted or may be used in combination. The scope of the present invention should be determined with reference to the appended claims, along with the full scope of equivalents to which the claims are entitled.

LIST OF REFERENCE NUMERALS

10 Grommet
11 Inner member
12 Grommet main body
13 Tubular portion
14 Engagement piece
15 Protruding portion
16 Flange portion
21 Base portion
22 Opposing portion
22a Intermediate portion
22b Inclined surface
23 Insertion portion
24 Covering portion
25 Holding portion
26 Seal portion
31 First lip portion
31a Outer surface
32 Second lip portion
32a Outer surface
33 Crossing portion
D Insertion direction
L Central axis
P Vehicle body panel
Pa Attachment hole
S Space
W Wire harness

What is claimed is:

1. A grommet comprising:
an opposing portion that opposes a circumferential portion of an attachment hole of a vehicle body panel through which a wire harness is passed; and
an annular seal portion that is provided in the opposing portion and is brought into tight contact with the vehicle body panel,
wherein the seal portion includes: an annular first lip portion that extends from the opposing portion toward the vehicle body panel; and an annular second lip portion that extends from the opposing portion toward the vehicle body panel and is provided radially inward of the first lip portion,
the first lip portion is inclined radially outward toward a tip end of the first lip portion, and
the second lip portion is inclined radially inward toward a tip end of the second lip portion, a thickness of the opposing portion increases in a direction in which the opposing portion opposes the circumferential portion of the attachment hole of the vehicle body as the opposing portion extends radially outward toward a base end portion of the second lip portion such that the opposing portion includes an inclined surface that opposes the second lip portion, and
a distance between the inclined surface and the second lip portion in a state where the seal portion is compressed by the vehicle body panel is less than a distance between the inclined surface and the second lip portion in a state where the seal portion is apart from the vehicle body panel.

2. The grommet according to claim 1,
wherein, in a state in which the grommet is attached to the vehicle body panel, an outer surface of the first lip portion and an outer surface of the second lip portion are spaced apart from the opposing portion.

3. The grommet according to claim 1,
wherein the vehicle body panel is a panel that separates an inside from an outside of a cabin of the vehicle, and
the grommet is configured such that, in a state in which the grommet is attached to the vehicle body panel, the first lip portion and the second lip portion are in tight contact with an inside surface of the vehicle body panel.

4. The grommet according to claim 1, comprising:
a grommet main body that includes the opposing portion and the seal portion; and
an inner member that is made of a material that is more rigid than the grommet main body,
wherein the inner member includes: an engagement piece that is engaged with a surface of the vehicle body panel that is opposite to a surface with which the seal portion is brought into tight contact at a circumferential edge of the attachment hole; and a flange portion that is held by the opposing portion of the grommet main body, and
in a state in which the engagement piece is engaged with and attached to a circumferential edge of the attachment hole, the seal portion is compressed between the vehicle body panel and the flange portion.

5. The grommet according to claim 4,
wherein the opposing portion includes an intermediate portion that is provided between the flange portion and the vehicle body panel,
the second lip portion extends from the intermediate portion toward the vehicle body panel, and
the intermediate portion is formed such that a thickness of the intermediate portion increases in a direction in which the flange portion and the vehicle body panel oppose each other as the intermediate portion extends toward the base end portion of the second lip portion.

6. The grommet according to claim 1,
wherein the seal portion further includes a crossing portion having a V-like cross-sectional shape where a base end portion of the first lip portion and the base end portion of the second lip portion cross each other.

7. The grommet according to claim 1,
wherein in the state where the seal portion is compressed by the vehicle body panel, mutually opposing surfaces of the first lip portion and the second lip portion are brought into tight contact with the circumferential portion of the attachment hole of the vehicle body panel.

* * * * *